US 8,221,882 B2
Jul. 17, 2012

(12) United States Patent
Yamada et al.

(10) Patent No.: US 8,221,882 B2
(45) Date of Patent: Jul. 17, 2012

(54) PROCESS AND APPARATUS FOR PRODUCING INORGANIC SPHERES

(75) Inventors: Kenji Yamada, Kanagawa (JP); Shin Tatematsu, Kanagawa (JP); Kazuhiko Yamada, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 1627 days.

(21) Appl. No.: 10/866,694

(22) Filed: Jun. 15, 2004

(65) Prior Publication Data
US 2004/0256750 A1 Dec. 23, 2004

(30) Foreign Application Priority Data
Jun. 18, 2003 (JP) .................. 2003-173285

(51) Int. Cl.
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| C01B 33/12 | (2006.01) |
| C01B 13/14 | (2006.01) |

(52) U.S. Cl. ............. 428/402; 423/338; 423/592.1
(58) Field of Classification Search .......... 423/338, 423/339, 592.1; 502/12; 264/41; 252/315.7; 428/402
See application file for complete search history.

(56) References Cited

U.S. PATENT DOCUMENTS

| 4,201,691 A | 5/1980 | Asher et al. |
| 5,278,106 A | 1/1994 | Nakashima et al. |
| 5,376,347 A | 12/1994 | Ipponmatsu et al. |
| 5,849,055 A | 12/1998 | Arai et al. |
| 6,177,479 B1 | 1/2001 | Nakajima et al. |
| 6,576,023 B2 | 6/2003 | Nakajima et al. |
| 7,022,300 B2* | 4/2006 | Matsubara et al. ........ 423/338 |
| 2004/0251569 A1* | 12/2004 | Matsubara et al. ........ 264/5 |

FOREIGN PATENT DOCUMENTS

| CN | 1219889 A | 6/1999 |
| EP | 0 963 787 | 12/1999 |
| EP | 1 197 262 | 4/2002 |
| EP | 1 382 384 | 1/2004 |
| JP | 2-95433 | 4/1990 |

(Continued)

OTHER PUBLICATIONS

Joscelyne, Simon M. et al. "Membrane Emulsification—A Literature Review", 2000, Journal of Membrane Science, 169 (2000), pp. 107-117.*

(Continued)

*Primary Examiner* — Stanley Silverman
*Assistant Examiner* — Anthony J Zimmer
(74) *Attorney, Agent, or Firm* — Oblon, Spivak, McClelland, Maier & Neustadt, L.L.P.

(57) ABSTRACT

A process for producing inorganic spheres, which comprises injecting an aqueous liquid containing an inorganic compound into a laminar flow of an organic liquid which runs at a flow rate of from 0.001 to 2 m/s in a flow path through a porous membrane to form a W/O type emulsion and solidifying the aqueous liquid containing an inorganic compound in the W/O type emulsion.

12 Claims, 2 Drawing Sheets

FOREIGN PATENT DOCUMENTS

| | | |
|---|---|---|
| JP | 2-106958 | 4/1990 |
| JP | 2-208329 | 8/1990 |
| JP | 5-192907 | 8/1993 |
| JP | 6-1854 | 1/1994 |
| JP | 8-2416 | 1/1996 |
| JP | 2000-507497 | 6/2000 |
| WO | WO 00/59625 | 10/2000 |
| WO | WO 2004/101139 | 11/2004 |

OTHER PUBLICATIONS

Schroder, Volker et al. "Effect of Dynamic Interfacial Tension on the Emulsification Process Using Microporous, Ceramic Membranes", 1998, Journal of Colloid and Interface Science, 202 (1998), pp. 334-340.*

Rayner, Marilyn et al. "Membrane Emulsification Modelling: How Can We Get From Characterization to Design?", 2002, Desalination, 145 (2002), pp. 165-172.*

Katoh, Ryoh et al. "Preparation of Food Emulsions Using a Membrane Emulsification System", 1996, Journal of Membrane Science 113 (1996) pp. 131-135.*

Iizuka et al. JP59-112830 Abstract. Patent Abstracts of Japan. Jun. 29, 1984.*

Suzuki et al. "Preparation of High Concentration O/W and W/O Emulsions by the Membrane Phase Inversion Emulsification Using PTFE Membranes" Food Science Technology Research, 5 (2), 234-238 (1999).*

"Membrane Filters", Product brochure from Advantec. Available at http://www.advantec.co.jp/english/product/membrane_filters.pdf#page=1 pp. 1-16.*

Yamazaki et al. "A Comparison of Membrane Emulsification Obtained Using SPG (Shirasu Porous Glass) and PTFE [Poly(Tetrafluoroethylene)] Membranes" Journal of Dispersion Science and Technology, 23(1-3), 279-292 (2002).*

Dowding et al. "Production of porous suspension polymer beads with a narrow size distribution using a cross-flow membrane and a continuous tubular reactor", Colloids and Surfaces A, 180 (2001) 301-309.*

Abrahamse et al. "Analysis of droplet formation and interactions during cross-flow membrane emulsification", Journal of Membrane Science 204 (2002) 125-137.*

U.S. Appl. No. 12/575,501, filed Oct. 8, 2009, Kadowaki, et al.

* cited by examiner

PROCESS AND APPARATUS FOR PRODUCING INORGANIC SPHERES

The present invention relates to a process for producing inorganic spheres. Particularly, it relates to a process and an apparatus for continuously producing inorganic spheres having a substantially uniform particle size useful for chromatography supports, cosmetic applications, catalyst supports, etc.

Heretofore, various methods have been proposed to obtain inorganic spheres having a uniform particle size. Japanese Patent No. 2106958 discloses a method of producing inorganic spheres which comprises injecting an aqueous liquid into an organic solvent through a microporous membrane and converting the droplets in the resulting W/O type emulsion into inorganic spheres. The particle size distribution of the emulsion can be narrowed by this method, but this method is insufficient in terms of uniformity in the particle size of the inorganic spheres, since the flow of the organic liquid is not controlled. Further, because a glass microporous membrane with poor alkali resistance has problems with its durability such as erosion of the pores to larger size by an aqueous solution containing an alkali metal silicate as the aqueous liquid, a W/O type emulsion having a uniform particle size can not be obtained continuously and stably.

In recent years, U.S. Pat. No. 6,576,023 proposed a method and apparatus for producing a homogenous emulsion by injecting a pressurized aqueous solution containing an inorganic compound through distorted inlet holes into an organic liquid. Recently, development of a method and an apparatus which allow long-term efficient and stable mass production of inorganic spheres having a uniform particle size has been desired.

The object of the present invention is to provide a process for producing inorganic spheres having highly uniform particle sizes continuously and stably with high productivity.

The present invention provides a process for producing inorganic spheres, which comprises injecting an aqueous liquid containing an inorganic compound into a laminar flow of an organic liquid which runs at a flow rate of from 0.001 to 2 m/s in a flow path through a porous membrane to form a W/O type emulsion, and solidifying the aqueous liquid containing an inorganic compound in the W/O type emulsion.

The present invention also provides an apparatus for producing inorganic spheres, which is constituted in such a manner that an aqueous liquid containing an inorganic compound is injected into a laminar flow of an organic liquid which runs at a flow rate of from 0.001 to 2 m/s in a flow path through a porous membrane to form a W/O type emulsion, and the aqueous liquid containing an inorganic compound in the W/O type emulsion is solidified to form inorganic spheres, wherein the pressure loss in the organic liquid between the upstream end and the downstream end of the flow path is from 10 to 5000 Pa.

Figure 1:
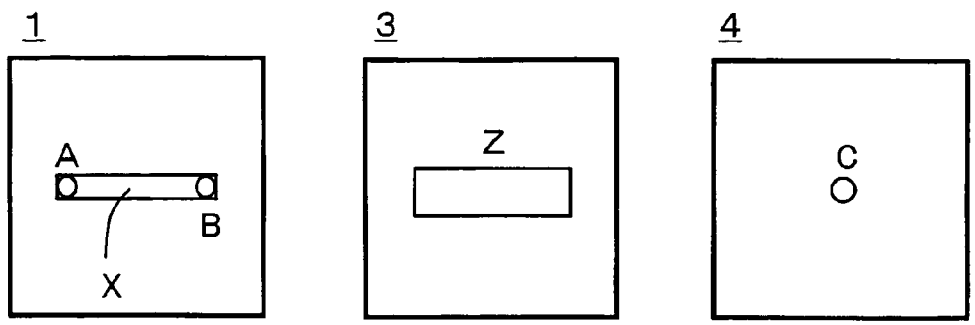
FIG. 1 shows parts of the emulsification apparatus used in Examples 1 and 2.

In the present invention, an aqueous liquid containing an inorganic compound is injected through a porous membrane into a laminar flow of an organic liquid to form an emulsion containing the organic liquid as a dispersion medium (continuous phase) and droplets of the aqueous solution containing an inorganic compound as a dispersed phase in the continuous phase, i.e. a so-called W/O type emulsion, and then the droplets of the aqueous liquid containing an inorganic compound in the W/O type emulsion are solidified to form inorganic spheres.

As the aqueous liquid containing an inorganic compound, any liquid may be used so long as it forms a precipitate upon solidification. Not only an aqueous solution of an inorganic compound but also a colloidal solution such as a silica sol or an alumina sol may be employed. As the aqueous solution of an inorganic compound, an aqueous solution of the silicate or aluminate of an alkali metal, a halide of an alkaline earth metal, a sulfate, hydrochloride or nitrate of copper, a sulfate, hydrochloride or a nitrate of iron, cobalt or nickel may be mentioned.

In the present invention, use of an aqueous liquid containing an alkali silicate or silica as the aqueous liquid containing an inorganic compound is preferred. Specifically, an aqueous solution containing a water-soluble silica and an aqueous dispersion containing a solid silica (colloidal silica) such as a silica sol obtained by hydrolysis of an organic silicon compound or a commercially available silica sol, an aqueous solution of potassium silicate and sodium silicate are preferably used. An aqueous solution of sodium silicate is particularly preferably used for availability and economical reasons. The proportion of sodium to silicic acid is preferably from 2.0 to 3.8, particularly preferably from 2.0 to 3.5, in terms of $SiO_2/Na_2O$ molar ratio. The concentration of the alkali silicate or silica in the aqueous liquid is preferably from 5 to 30 mass %, particularly preferably from 5 to 25 mass %, in terms of $SiO_2$.

As the organic liquid, a $C_{9-12}$ saturated hydrocarbon is preferred, and selection of the organic liquid includes total consideration of ease of handling, fire safety, ease of separation between the solidified particles and the organic liquid, geometrical properties of the inorganic spherical particles, solubility of the organic liquid in water, etc. The $C_{9-12}$ saturated hydrocarbon may be used alone or as a mixture of at least two. The $C_{9-12}$ saturated hydrocarbon may be a linear hydrocarbon or a hydrocarbon having side chains so long as its chemical stability is good.

As the $C_{9-12}$ saturated hydrocarbon, preferred is one having a flash point of from 20 to 80° C. If a saturated hydrocarbon having a flash point below 20° C. is employed as the organic liquid, the excessively low flash point necessitates countermeasures for fire prevention and work environment protection. On the other hand, a hydrocarbon having a flash point exceeding 80° C. is hardly volatile and may adhere to the resulting inorganic spheres in a large amount.

In the present invention, after solidification of the emulsion, the inorganic spheres and the organic liquid are usually subjected to solid-liquid separation. The organic liquid adhering to or adsorbed in the inorganic spheres after separation is preferably vaporized off by e.g. a drying operation. The organic liquid preferably has a boiling point of at most 200° C. so that the organic liquid easily vaporizes off, and as the organic liquid which satisfies such requirements, preferred is at least one member selected from the group consisting of $C_9H_{20}$, $C_{10}H_{22}$ and $C_{11}H_{24}$.

In the present invention, it is preferred to employ a surfactant for formation of the W/O type emulsion. As the surfactant, although an anionic surfactant or a cationic surfactant may be employed, a nonionic surfactant is preferred because adjustment of the balance between hydrophilicity and lipophilicity is easy. For example, a polyethylene glycol fatty acid ester, a polyethylene glycol alkyl ether, a sorbitan fatty acid ester, a polyoxyethylene sorbitan fatty acid ester, a polyoxyethylene alkyl phenyl ether and a polyoxyethylene alkyl ether are preferred.

The amount of the surfactant varies depending upon conditions such as the type of the surfactant, HLB (hydrophile-lipophile balance) as an index of the degree of hydrophilicity or hydrophobicity of the surfactant and the aimed particle size of the inorganic spheres. However, it is preferably contained in an amount of from 500 to 50,000 ppm, preferably from 1,000 to 30,000 ppm, in the organic liquid. If it is less than 500 ppm, an unstable emulsion which contains large droplets of the aqueous solution may be obtained upon emulsification. On the other hand, if it exceeds 50,000 ppm, the amount of the surfactant adhering to the inorganic spherical particles as the product unfavorably tends to be large.

In the present invention, by adjusting the flow rate of the organic liquid to from 0.001 to 2 m/s, emulsion droplets having a narrow particle size distribution are formed, and therefore, the particle size distribution of the obtained inorganic spheres can be narrowed. The flow rate of the organic liquid is particularly preferably from 0.01 to 1 m/s.

It is preferred that the Reynolds number of the flow of the organic liquid in the flow path is at most 2,100. When the flow path has a circular cross section, the Reynolds number is calculated from the formula 1, and as the inner diameter D of the flow path, the minimum diameter of the cross section of the flow path is employed. D is the inner diameter (m) of the flow path, u is the average flow rate (m/s), $\rho$ is the fluid density (kg/m$^3$), and $\mu$ is the fluid viscosity (Pa·s).

$$\text{Reynolds number}(-) = D \cdot u \cdot \rho / \mu \quad \text{Formula 1}$$

When the cross section of the flow path is not circular, the Reynolds number is calculated from the formula 2. r is the hydraulic radius (m) of the flow path={cross-sectional area (m$^2$) of the flow path}/{perimeter (m) of the cross section of the flow path which is in contact with the liquid}, and u, $\rho$ and $\mu$ are as defined for the formula 1.

$$\text{Reynolds number}(-) = 4 \times r \cdot u \cdot \rho / \mu \quad \text{Formula 2}$$

If the Reynolds number is at most 2,100, the flow of the organic liquid is laminar and therefore stable. As a result, the aqueous liquid containing an inorganic compound supplied through the porous membrane constantly forms a W/O type emulsion having a fixed particle size, and therefore, inorganic spheres having a substantially uniform particle size are likely to be produced. On the other hand, if the Reynolds number exceeds 2,100, the flow of the organic liquid is turbulent. Therefore, the resulting W/O type emulsion tends to have uneven particle sizes, like conventional ones, and the resulting inorganic spheres also have uneven particle sizes. In order to stabilize the flow of the organic liquid, the Reynolds number of the flow of the organic liquid is preferably at most 1,500. It is particularly preferred that the Reynolds number is at most 700 to achieve a more stable flow of the organic liquid. The shape of the flow path for the organic liquid is not particularly limited.

Figure 2:
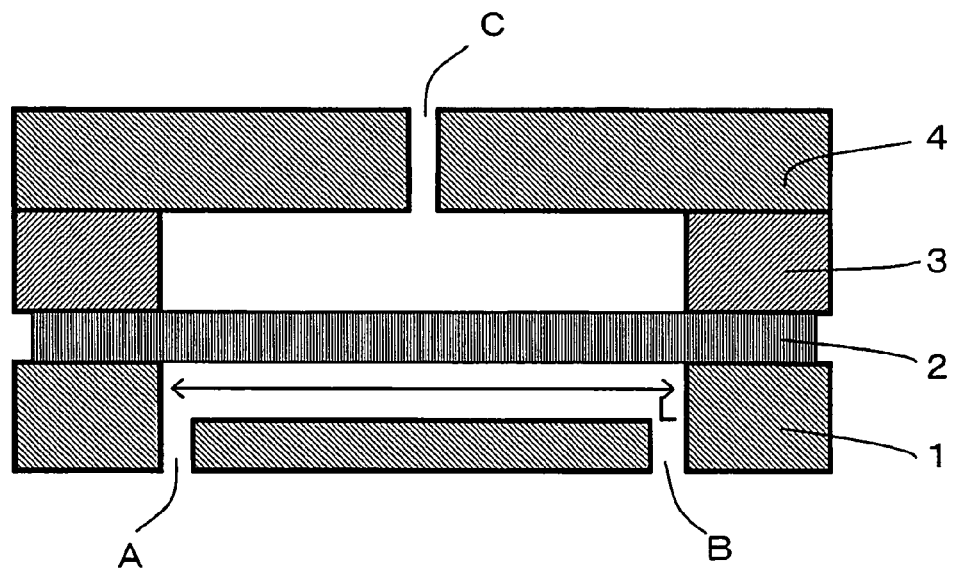
FIG. 2 is a cross-sectional view of the emulsification apparatus used in Examples 1 and 2.

Now, the mode for carrying out the present invention will be explained with reference to the drawings. In the drawings, numerical references 1, 3 and 4 designate acrylic resin plates, numerical reference 2 designates a porous membrane. In FIG. 2, an aqueous liquid containing an inorganic compound is introduced from a nozzle C and injected through a porous membrane 2 at a constant linear pressure into a laminar flow of an organic liquid which is introduced from a nozzle A and discharged from a nozzle B.

In the present invention, the porous membrane preferably has a pore size of from 0.01 to 20 µm, in particular from 0.1 to 10 µm, to facilitate formation of inorganic spheres having a uniform particle size.

The porous membrane 2 preferably has a porosity of from 10 to 90%. If the porosity of the porous membrane 2 is less than 10%, the injection pressure of the aqueous liquid containing an inorganic compound may be too high, while if the porosity exceeds 90%, the strength of the membrane may be insufficient. Either is not preferred.

The porous membrane 2 preferably has a thickness of from 1 to 2,000 µm. If the porous membrane 2 is thinner than 1 µm, the strength may be insufficient, while if it is thicker than 2000 µm, the injection pressure of the aqueous liquid containing an inorganic compound may be too high. Either is not preferred.

As the porous membrane 2, it is preferred to use a porous membrane having a $D_{90}/D_{10}$ of from 2 to 10, wherein $D_{10}$ and $D_{90}$ are pore sizes at which the cumulative pore size distribution curve of the porous membrane on a minimum diameter basis reaches 10% and 90%, respectively. The particularly preferable range of $D_{90}/D_{10}$ is from 2 to 5. If the $D_{90}/D_{10}$ is larger than 10, an emulsion having an excessively wide particle size distribution may unfavorably be obtained.

As the porous membrane 2, it is preferred to use a porous membrane having a bubble point of from 0.001 to 1 MPa as stipulated by JIS K-3832 because the injected amount of the aqueous liquid can be adjusted within an appropriate range. If the bubble point is below 0.001 MPa, the porous membrane may not be sufficiently strong, while if it exceeds 1 MPa, the injection pressure of the aqueous liquid containing an inorganic compound may be too high. Either is not preferred.

In the present invention, selection of the material for the porous membrane 2 includes consideration of the resistance to the aqueous liquid containing an inorganic compound and the organic liquid. A resin material or a metallic material is preferably used. Especially, a membrane mainly made of a fluororesin or a membrane mainly made of a sintered product of a metal powder or a metal fiber is preferred.

The kind of fluororesin is not particularly limited, and a membrane mainly made of PTFE (polytetrafluoroethylene), PFA (polyperfluoroalkoxyalkane), ETFE (ethylene-tetrafluoroethylene copolymer), FEP (tetrafluoroethylene-hexafluoropropylene copolymer), PVdF (polyvinylidene fluoride), ECTEE (ethylene-chlorotrifluoroethylene copolymer) is preferably used. Preferable examples of the membrane mainly made of a sintered product of a metal powder or a metal fiber include a porous membrane obtained by sintering a spherical metal powder of uniform size and a silver membrane filter. In addition, a porous membrane mainly made of a cellulosic co-ester or a polycarbonate or a porous glass filter may preferably be used. As the cellulosic co-ester, cellulose acetate is preferably used.

The porous membrane 2 preferably has affinity for the organic liquid or water repellency, and if necessary, may be subjected to surface treatment, in order to facilitate release of the aqueous liquid containing an inorganic compound from the porous membrane after it comes out of the porous membrane. If the porous membrane 2 is hydrophilic, the aqueous liquid unfavorably tends to flow along the porous membrane 2 and form uneven droplets in the emulsion. Especially, when the porous membrane 2 is mainly made of a metal, a cellulosic co-ester or polycarbonate, water repellent treatment with a water repellent obtained by dissolving a hydrophobic resin or a silane coupling agent in a solvent is preferred. The water repellent treatment is preferably given to at least part of the porous membrane 2 which comes into contact with the organic liquid.

As the hydrophobic resin, a thermoplastic resin is preferably used, because even if the pores in the porous membrane 2 are clogged upon the water repellent treatment, the pores can be opened again by heating. A solvent-soluble fluororesin is preferably used as the hydrophobic resin in terms of durability. Though the water repellent treatment can be done by any method, dip coating is preferable to give a uniformly thin and even coating of a water repellent.

The porous membrane 2 is preferably in the form of a sheet or a hollow fiber. In the case of a membrane in the form of a sheet, the porous membrane 2 is set so as to make one side of a n-decane flow path X having a rectangular cross section as shown in FIG. 2, and the aqueous liquid is injected through the porous membrane 2 to form a W/O type emulsion. In the case of a membrane in the form of a hollow fiber, though the organic liquid may flow outside or inside the porous membrane, it is preferred that the organic liquid flows inside the porous membrane 2, while the aqueous liquid permeates inward from outside to form a W/O type membrane. In the case of a porous membrane in the form of a hollow fiber, it is particularly preferred to bundle a plurality of a hollow fiber into a hollow fiber module, in terms of productivity.

The aqueous liquid injected from one side of the porous membrane 2 grows into droplets larger than the pores in the porous membrane on the opposite side of the porous membrane 2 due to the interfacial tension. Then, the droplets are carried away by the flow of the organic liquid to form a W/O type emulsion containing the droplets in the organic liquid. In the laminar flow of the organic liquid, the droplets are always released under the same conditions with almost uniform size.

If a pressure loss arises in the flow path for the organic liquid, a pressure difference arises between the aqueous liquid and the organic liquid and makes the particle size distribution of the emulsion droplets broader. As a result, inorganic spheres with uneven particle sizes tend to be obtained. For example, suppose the pressure loss in the flow path for the organic liquid is significant. At the upstream part of the flow of the organic liquid, because the pressure difference between the aqueous liquid and the organic liquid is relatively small, the aqueous liquid is injected into the organic liquid in a limited amount and as a result, tends to form small emulsion droplets. At the downstream part of the flow, because the pressure difference between the aqueous liquid and the organic liquid is relatively large, the aqueous liquid is injected in a larger amount and forms large emulsion particles, and as a result, inorganic spheres showing a broad particle size distribution are likely to be obtained.

In the present invention, it is preferred that the pressure loss in the organic liquid between the upstream and downstream ends of the organic liquid flow path is from 10 to 5,000 Pa, because the injection of the aqueous liquid is stabilized throughout the porous membrane 2, and as a result, inorganic spheres with a uniform particle size are likely to be obtained. To obtain particles of uniform size, it is preferred that the pressure loss is less than 2,000 Pa, in particular less than 1,000 Pa. At a pressure loss of below 10 Pa, because the flow of the organic liquid is slow and can not carry away emulsion droplets so effectively, emulsion particles outside the aimed particle size range unfavorably tend to form.

The pressure loss (Pa) in the organic liquid through the organic liquid flow path is given by the formula representing the pressure loss in a laminar flow found in the Handbook on Chemical Engineering 5th edition. When the cross section is circular, the pressure loss is calculated from the formula 3, where L is the length of the flow path (m), and D, u and $\mu$ are the same as defined in the formula 1.

$$\text{Pressure loss} = 32\mu Lu/D^2 \qquad \text{formula 3}$$

When the flow path is rectangular, it is given by the formula 4, where $X = 16/3 - 1024/\pi^5 \times (b/a) \times \{\tanh(\pi a/2b) + 1/243 \times \tanh(3\pi a/2b) + \ldots\}$ where a is the length (m) of the longer side of the rectangle, b is the length (m) of the shorter side of the rectangle, and L, u and $\mu$ are the same as defined in the formula 3.

$$\text{Pressure loss} = 32\mu Lu/(b^2 X/2) \qquad \text{formula 4}$$

In the present invention, the distance L between the upstream end and the downstream end of the organic liquid flow path, as shown in FIG. 2, is preferably from 10 to 2,000 mm. If L is smaller than 10 mm, productivity may be insufficient. On the other hand, if it exceeds 2000 mm, because the flow of the organic liquid has to be slow in order to keep the pressure loss at from 10 to 5,000 Pa, the flow of the organic liquid can not carry away emulsion droplets effectively, and as a result, emulsion droplets outside the aimed particle size unfavorably tend to form.

The apparatus for producing inorganic spheres of the present invention may be installed so that the porous membrane 2 is parallel to a horizontal plane. However, when the density of the organic liquid is smaller than the density of the aqueous liquid, it is preferred to set the organic liquid flow path at an angle of at least 30°, in particular with a right angle, to a horizontal plane and flow the organic liquid upwards, because inorganic spheres are likely to be obtained in uniform particle size. On the other hand, when the density of the organic liquid is larger than the density of the aqueous liquid, the apparatus is preferably used so that the organic liquid flows downwards, because it is easy to obtain the above-mentioned effect of uniform particle sizes.

When the porous membrane 2 is set at an angle of at least 30° to a horizontal plane, a pressure due to the liquid depth is applied to a horizontal plane at a certain height both on the aqueous liquid side and on the organic liquid side. On the assumption that the depths of the aqueous liquid and the organic liquid are substantially the same at a certain horizontal plane, a pressure difference corresponding to {(the density of the aqueous liquid)−(the density of the organic liquid)}× (liquid depth) arises due to the difference in density between the aqueous liquid and the organic liquid. Accordingly, it is possible to relatively even out the pressure difference between the aqueous liquid side and the organic liquid side throughout the entire flow path, by flowing the organic liquid upwards when the density of the organic liquid is larger than that of the aqueous liquid, or by flowing it downwards in the opposite case, as compared with when the flow path of the organic liquid is parallel to a horizontal plane. As a result, the amount of the aqueous liquid supplied can be stabilized throughout the porous membrane 2, the emulsion droplet size will be uniform, and the effect of uniform particle size of the obtained inorganic spheres is obtained.

The particle sizes of the droplets in the resulting W/O type emulsion are affected not only by the physical properties of the porous membrane 2 and the installation conditions for the porous membrane 2 mentioned above, but also by the ratio of the linear velocity (unit: mm/sec) of the organic liquid to the linear velocity (unit: mm/(sec·mm$^2$)) of the aqueous liquid in the flow direction. In FIG. 2, the linear velocity of the aqueous liquid in the flow direction is measured on the surface of the porous membrane 2. Though it depends on the pore size of the porous membrane 2, the linear velocity ratio is preferably from 100 to 500,000, particularly preferably at most 200,000. It is not economically preferable that the ratio exceeds 500,000 because the organic liquid is likely to be overspent. It is unfavorable that the ratio is less than 100, because the flow of the organic liquid can not carry away the droplets effectively, and uneven emulsion droplets are likely to be formed.

Solidification of the aqueous liquid containing an inorganic compound in the W/O type emulsion into inorganic spheres may be achieved by precipitation of the inorganic compound by a precipitant. The precipitant may be an aqueous solution of at least one member selected from the group consisting of a halide or a carbonate of an alkali metal, an inorganic acid, an organic acid, the ammonium salt of an inorganic acid, the ammonium salt of an organic acid and a halide of an alkaline earth metal. Specifically, an aqueous solution of e.g., ammonium hydrogen carbonate, ammonium sulfate, potassium chloride or potassium hydrogen carbonate may be mentioned, but it is not limited thereto.

When the inorganic compound in the aqueous liquid containing an inorganic compound is an alkali silicate or silica, gelation of the W/O type emulsion allows the dispersed spherical droplets of the aqueous solution to gel in the same shape and gives a spherical silica hydrogel. For gelation, it is preferred to introduce a gelling agent to the emulsion. As the gelling agent, an acid such as an inorganic acid or an organic acid is employed, and particularly an inorganic acid, e.g., sulfuric acid, hydrochloric acid, nitric acid or carbon dioxide is preferred. Use of carbon dioxide is the simplest and the most suitable from the viewpoint of easy operations. As the carbon dioxide gas, pure carbon dioxide gas having a 100% concentration may be introduced, or carbon dioxide gas diluted with air or an inert gas may be introduced. The gelation time is usually preferably from 4 to 30 minutes, and the gelation temperature is preferably from 5 to 30° C.

After completion of the gelation, it is preferred to keep the reaction system still so that the emulsion separates into two phases, the organic liquid phase and the aqueous phase containing a silica hydrogel, and then isolate the silica gel. When a saturated hydrocarbon is used as the organic liquid, the phase of the organic liquid separates out as the upper layer, while the phase of the aqueous liquid containing the silica hydrogel separates out as the lower layer, and then they are separated by a known means, preferably by means of a separator.

If necessary, an acid such as sulfuric acid is added to the aqueous slurry of the silica hydrogel to a pH of about from 1 to 5 to complete the gelation, and then the aqueous slurry is subjected to steam distillation at a temperature of from 60 to 150° C., preferably from 80 to 120° C. to evaporate any slight amount of the saturated hydrocarbon remaining in the aqueous slurry and heated at an appropriate pH of about from 7 to 9 to age the silica hydrogel.

After the aging, the aqueous slurry is filtered arbitrarily to recover the silica hydrogel, and the silica hydrogel is dried at a temperature of about from 100 to 150° C. for from 1 to 30 hours to give porous silica spheres.

When an alkali silicate aqueous solution is used as the aqueous liquid with an acid as the gelling agent, it is preferred to adequately wash the silica hydrogel recovered by filtration (wet cake) with water in order to prevent an alkali metal salt (e.g., sodium carbonate when the gelling agent is carbon dioxide) formed as a by-product from contaminating the porous silica spheres. If necessary, water may be added to the washed wet cake to make a slurry again, and filtration and washing with water are repeated again. In this case, pH adjustment of the slurry to about from 1 to 5 and aging of the silica hydrogel may be carried out again, if necessary.

EXAMPLE 1

(1) Preparation of Solutions

A sodium silicate aqueous solution having a $SiO_2$ concentration of 24.4 mass % and a $Na_2O$ concentration of 8.14 mass % ($SiO_2/Na_2O$ molar ratio=3.09, density: 1,320 kg/m³) was prepared. As the organic liquid, n-decane ($C_{10}H_{22}$, density: 730 kg/m³) was employed, and sorbitan monooleate as a surfactant was preliminarily dissolved in an amount of 10,000 ppm in n-decane.

(2) Assembly of Emulsification Apparatus

In a 50 mm-square acrylic resin plate having a thickness of 2 mm, a channel having a width of 500 μm, a depth of 500 μm and a length of 3 cm was cut as a n-decane flow path X, as shown in FIG. 1, and holes having an inner diameter of 500 μm were opened at both ends of the n-decane flow path X. A syringe needle having an outer diameter of 510 μm, which is graphically omitted, was fitted into each hole and fixed with an epoxy adhesive to make nozzles A and B so that a liquid could be supplied through the nozzle A, and the liquid could be discharged through the nozzle B. In the center of another 50 mm-square acrylic resin plate 3 having a thickness of 2 mm, a 10 mm×30 mm hole was opened to make an aqueous liquid flow path Z, as shown in FIG. 1. At the center of another 50 mm-square acrylic resin plate 4 having a thickness of 2 mm, a hole having an inner diameter of 500 μm was opened as shown in FIG. 1, and a syringe needle having an outer diameter of 510 μm, which is graphically omitted, was fitted into the hole and fixed with an epoxy adhesive to make a nozzle C.

Figure 3:
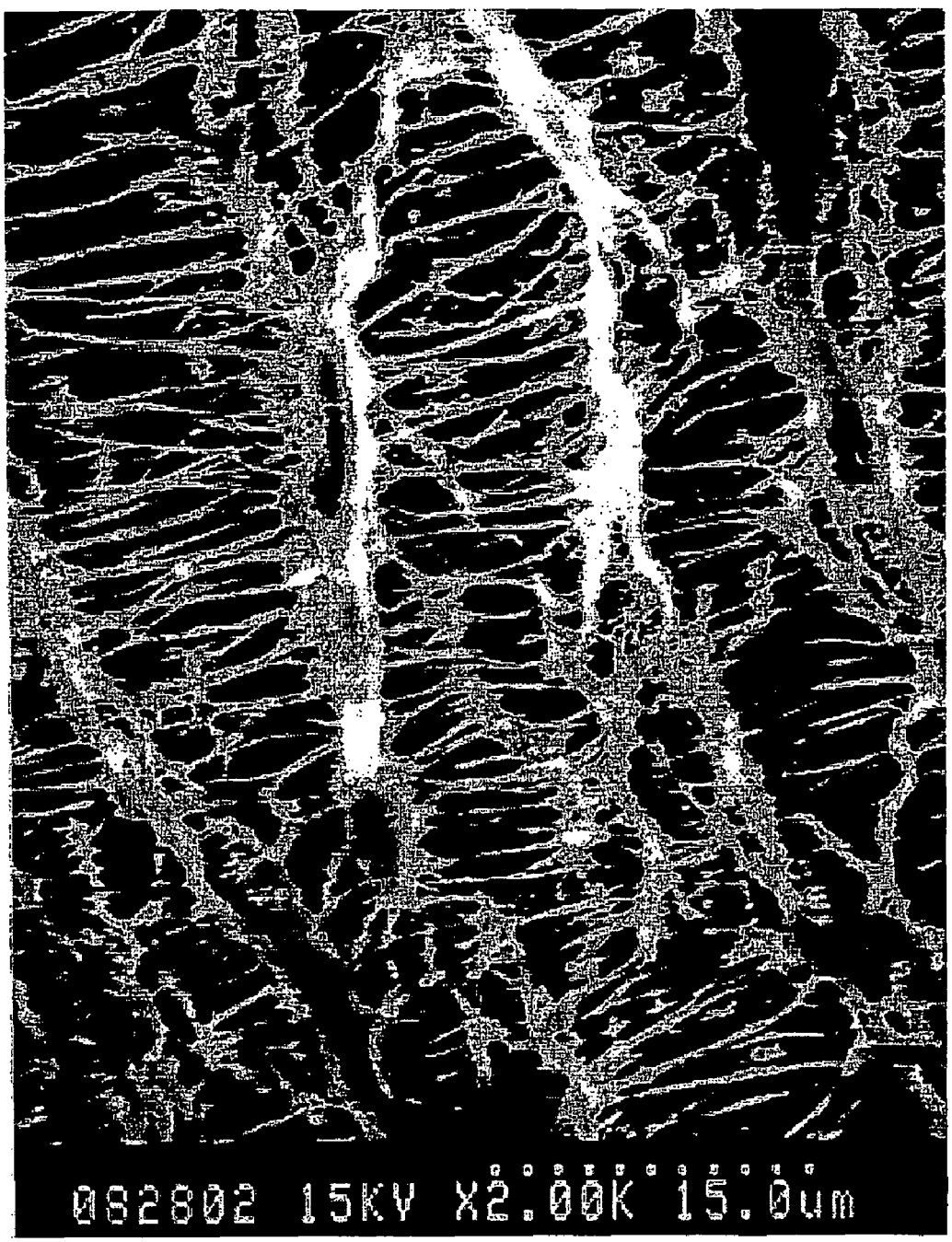
FIG. 3 is a scanning electron micrograph of the porous membrane 2 used in Examples 1 and 2.

As the porous membrane 2, a polytetrafluoroethylene membrane filter (manufactured by Advantec Toyo, trade name: T050A047A) in which fibrils are connected three-dimensionally via nodes, was used. The membrane filter has a pore size of 0.50 μm, a porosity of 78% and a thickness of 75 μm. The cumulative pore distribution of the porous membrane 2 obtained by image analysis of the electron scanning micrograph shown in FIG. 3 indicates $D_{90}/D_{10}$=3.1. The isopropyl alcohol bubble point as stipulated by JIS-K3832 (ASTM F316-86) was $6.3 \times 10^{-2}$ MPa or higher.

The acrylic resin plate 1, the porous membrane 2, the acrylic resin plate 3 and the acrylic resin plate 4 were laminated in this order, and the four sides were clamped with equal forces. The assembled apparatus was checked for leaks by preliminarily supplying water.

(3) Emulsification

The emulsification apparatus assembled in (2) was placed at a right angle to a horizontal plane, and the surfactant-containing n-decane prepared in (1) was flown upwards from the nozzle A, while the sodium silicate aqueous solution prepared in (1) was supplied from the nozzle C to continuously produce a W/O type emulsion having the sodium silicate aqueous solution dispersed in the surfactant-containing n-decane. The emulsion was discharged from the nozzle B. The surfactant-containing n-decane was supplied at a rate of 50 mL/h. The experiment was carried out at room temperature for 1 hour.

The Reynolds number of the flow of the n-decane was about 25 as calculated from a hydraulic radius of the flow path of 125 μm, a linear velocity of 56 mm/s and a viscosity of $8.0 \times 10^{-4}$ Pa·s, and the flow of n-decane was laminar. Since the length L between the upstream end and the downstream end of the rectangular n-decane flow path X was 30 mm, the pressure loss over L is calculated at 152 Pa from the formula 4, and the pressure difference due to the depth of the n-decane was 214 Pa. Therefore, the pressure difference is calculated to be 366 Pa in total. On the sodium silicate side, since the pressure loss in the sodium silicate aqueous solution which flows slowly is negligible, it is calculated that only a pressure difference of 388 Pa due to the liquid depth arises. Therefore, it is calculated when the sodium silicate aqueous solution was injected into the n-decane, the change in the pressure difference at L was 22 Pa.

The supply of the sodium silicate aqueous solution was 0.03 mL/h, and the linear velocity on the surface of the porous membrane 2 was 0.00056 mm/(s·mm$^2$), per unit area of the porous membrane 2.

The ratio of the linear velocity of the n-decane in the flow direction to the linear velocity of the sodium silicate aqueous solution supplied through the porous membrane 2 in the flow direction on the surface of the porous membrane 2 was 100,000. Continuous emulsification monitoring using a high speed camera revealed that the sodium silicate aqueous solution formed droplets as it came out of the porous membrane 2, and the emulsion droplets had a substantially uniform particle size of about 1.5 μm.

(4) Gelation

The surfactant-containing n-decane prepared in (1) was put in a 50 mL graduated cylinder and carbon dioxide gas was blown into it at a supply rate of 100 mL/min. The W/O type emulsion prepared in (3) was continuously supplied to the graduated cylinder for preliminary gelation. The resulting silica hydrogel was allowed to separate out from the n-decane using biphasic separation based on the difference in specific gravity between them, and the aqueous silica hydrogel slurry was obtained. Then, the aqueous silica hydrogel slurry was adjusted to pH 9 at 25° C. with 0.1 N aqueous sulfuric acid and aged at 80° C. for 1 hour. Then, it was allowed to cool to room temperature, adjusted to pH 2 with 20 mass % aqueous sulfuric acid, allowed to stand still for 3 hours and filtered. The filter cake was washed with water and dried at 120° C. for 20 hours to give porous silica spheres.

(5) Geometrical Analysis

It was confirmed by scanning electron microphotography that the porous silica spheres were almost completely spherical. The particle size distribution was calculated by actually measuring the particle sizes of a total of more than 1000 spheres in several photographs. The arithmetical mean particle size was 1.1 μm with a standard deviation of 0.35 μm. The value obtained by dividing the standard deviation in the particle size distribution by the arithmetical mean particle size was 0.32, which indicates that the porous silica spheres had a substantially uniform particle size.

EXAMPLE 2

A W/O type emulsion was continuously produced in the same manner as in Example 1 except that the emulsification apparatus was placed horizontally, as shown in FIG. 2. The pressure loss in the n-decane over the length L of the flow path was 152 Pa, which is attributable only to the pressure loss in the flow calculated in Example 1.

It was confirmed by scanning electron microphotography that the porous silica spheres were almost completely spherical. The arithmetical mean particle size was 1.1 μm with a standard deviation of 0.47 μm. The value obtained by dividing the standard deviation in the particle size distribution by the arithmetical mean particle size was 0.43, which indicates that the porous silica spheres had a substantially uniform particle size.

EXAMPLE 3 (COMPARATIVE EXAMPLE)

40 mL of the n-decane and 10 mL of the sodium silicate aqueous solution prepared in Example 1 were introduced in the vessel of an emulsifier/disperser manufactured by Tokushu Kika Kogyo (trade name: T.K. FILMICS FM-56-50) as the emulsification apparatus, and it was run at a rim speed of 30 m/s for 3 minutes to give a W/O type emulsion. The emulsion droplets had a substantially uniform particle size of about 0.8 μm.

Gelation and geometrical analysis were done in the same manner as in Example 1. It was confirmed by scanning electron microphotography that the porous silica spheres were almost completely spherical. The arithmetical mean particle size was 0.51 μm with a standard deviation of 0.43 μm. The value obtained by dividing the standard deviation in the particle size distribution by the arithmetical mean particle size was 0.84, which indicates a broader particle size distribution than those of the porous silica spheres obtained in Examples 1 and 2.

The present invention makes it possible to produce inorganic spheres having a substantially uniform particle size stably for a long time and stably with high productivity. Especially, it is possible to produce inorganic spheres of highly uniform particle size having an arithmetic mean particle size of from 0.05 to 20 μm as measured by scanning electron photography and a value of 0.50 or less, obtained by dividing the standard deviation in particle size distribution by the arithmetic mean particle size, while preventing production of large particles far beyond the aimed particle size range.

The entire disclosure of Japanese Patent Application No. 2003-173285 filed on Jun. 18, 2003 including specification, claims, drawings and summary is incorporated herein by reference in its entirety.

What is claimed is:

1. A process for producing inorganic spheres, comprising:
injecting an aqueous liquid comprising an inorganic compound into a laminar flow of an organic liquid which runs at a flow rate of from 0.001 to 2 m/s and at a Reynolds number of at most 2,100 in a flow path through a porous membrane to form a W/O type emulsion; and
solidifying the aqueous liquid comprising an inorganic compound in the W/O type emulsion;
wherein:
the porous membrane has a pore size of from 0.01 to 20 μm;
the porous membrane has a porosity of from 10 to 90%;
the porous membrane comprises a fluororesin; and
the porous membrane comprises fibers that are connected three-dimensionally via nodes.

2. The process for producing inorganic spheres according to claim 1, wherein the porous membrane has a thickness of from 1 to 2,000 μm.

3. The process for producing inorganic spheres according to claim 1, wherein the porous membrane has a $D_{90}/D_{10}$ of from 2 to 10, wherein $D_{10}$ and $D_{90}$ are pore sizes at which the cumulative pore size distribution curve of the porous membrane on a minimum diameter basis reaches 10% and 90%, respectively.

4. The process for producing inorganic spheres according to claim 1, wherein the porous membrane has a bubble point of from 0.001 to 1 MPa.

5. The process for producing inorganic spheres according to claim 1, wherein the pressure loss between the upstream end and the downstream end of the flow path for the organic liquid is from 10 to 5,000 Pa.

6. The process for producing inorganic spheres according to claim 1, wherein the porous membrane is set at an angle of at least 30° to a horizontal plane, and the organic liquid runs upwards along the porous membrane.

7. The process for producing inorganic spheres according to claim 1,
wherein:
the porous membrane has a pore size of from 0.01 to 10 μm.

8. The process for producing inorganic spheres according to claim 1, wherein the Reynolds number is at most 1,500.

9. The process for producing inorganic spheres according to claim 1, wherein the Reynolds number is at most 700.

10. The process for producing inorganic spheres according to claim 1, wherein the inorganic compound comprises potassium silicate or sodium silicate.

11. The process for producing inorganic spheres according to claim 1, wherein the organic liquid comprises a $C_{9-12}$ saturated hydrocarbon.

12. The process for producing inorganic spheres according to claim 1, wherein the flow rate of the organic liquid is from 0.01 to 1 m/s.

* * * * *